May 20, 1941.   D. DEMBER   2,242,290
OUTLET BOX
Filed Dec. 30, 1939
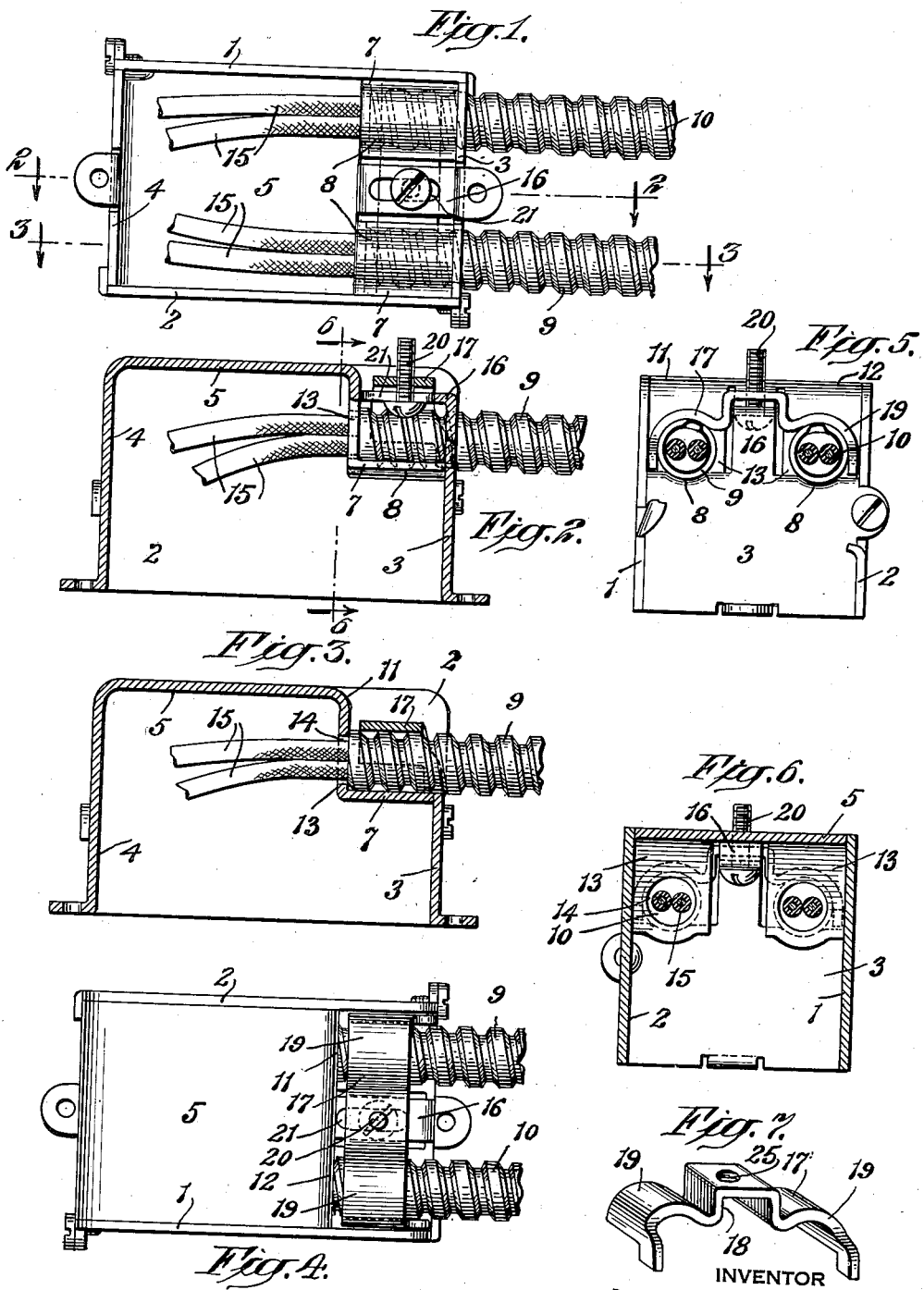
INVENTOR
David Dember
BY
Harry Radzinsky
ATTORNEY Patented May 20, 1941

2,242,290

UNITED STATES PATENT OFFICE 2,242,290

OUTLET BOX

David Dember, Waterbury, Conn.

Application December 30, 1939, Serial No. 311,758

3 Claims. (Cl. 220—3.2)

This invention relates to electric wiring devices and more particularly to outlet or junction boxes in which connections are made to the electric circuit.

One of the objections existant in outlet boxes of present-day construction is that the armored cables which must connect to and enter the box are somewhat difficult to extend into position and clamp in place. In many of the types of boxes in use at the present time, clamping means for engaging and gripping the armored cable is provided within the box in such a position as to render it almost inaccessible so that the job of threading the cable into the box through knockout openings and into position for engagement by the clamp, and then tightening up the clamp is a difficult and time-consuming operation.

The present invention therefore, contemplates the provision of an outlet box in which these deficiencies are remedied; in which one end of the armored cable or "BX" wire securely rests upon a seat provided at the back of the box and in which a clamping member on the outside of the box, operated by a screw from within the box, engages the cable and firmly holds it in position on the seat provided for its reception.

In the accompanying drawing, wherein an embodiment of the invention is shown, Fig. 1 is a front view of an outlet box made in accordance with the invention; Fig. 2 is a sectional view on the line 2—2 of Fig. 1, looking in the direction of the arrows; Fig. 3 is a sectional view on the line 3—3 of Fig. 1, looking in the direction of the arrows; Fig. 4 is a rear view of the box; Fig. 5 is a view of the end of the box into which the armored cables enter; Fig. 6 is a sectional view on the line 6—6 of Fig. 2, looking in the direction of the arrows; and Fig. 7 is a perspective view of the cable clamp.

In the illustrative form shown in the drawing the box comprises the parallel side walls 1 and 2, the end walls 3 and 4 and a back wall 5, the walls being united by any of the various methods common in this art. The general shape and proportions of the box are well known in the art.

Adjacent to the junction of the end wall 3 and the back wall 5, spaced portions 7 of said end wall are bent inwardly or toward the interior of the box to provide a pair of spaced clamping surfaces 8. It will be seen that these surfaces 8 are arched or curved, as clearly disclosed in Fig. 5 so that they closely fit the curvature of the armored or "BX" cables 9, 10 which are clamped against these surfaces as will be presently explained.

The back wall 5 of the box is bent inwardly at the spaced points 11, 12 to form a pair of cable-abutments 13, each of said elements 13 being integrally connected to one of the clamping surfaces 8, and formed with an aperture 14, through which insulated wires 15 from the armored cable may pass to enter into the box. Thus, by bending inwardly, co-operating portions of the end wall 2 and rear wall 5, a pair of spaced, cable-receiving seats are provided, each seat consisting of the apertured portion 13 and the clamping surface 8. Since the two seats so constituted are produced by forcing inwardly spaced parts of the end wall 2 and back wall 5, a separating element or tongue 16 is disposed between the seats and the same tends to keep the two armored cables in properly spaced relationship.

The cables 9 and 10 are firmly clamped on the seats by means of a clamp 17 having a centrally located grooved or recessed portion 18 fitting over the separating element 16 and kept thereby from assuming an askew or angular position. The clamp is formed with the two arms 19, each of which is curved or arched to conform to the curvature of the armored cable which it partly embraces and clamps against one of the clamping surfaces 8.

Adjustment of the clamp 17 is had by means of a screw 20 or similar threaded element, which has its head located on the interior of the box and is accordingly adjusted from within the box. The screw extends through a slot 21 located in the back of the box between the seats for the cables and the screw is extended through the threaded hole 25 in the central recessed portion 18 of the clamp. It will be apparent that by inserting a screw driver within the box to engage the slot in the head of the screw 20, the clamp may be adjusted to cause it to firmly clamp one or two of the armored cables between it and one or both of the clamping surfaces 8, thereby securely holding the cable or cables firmly attached to the box.

In applying the cables to the box, the clamp is loosened to such an extent as to permit the cables to be easily seated against the apertured seat portions 13 with the wires leading from the cables directed through the apertures 14 and into the interior of the box. Since the clamp is located wholly externally of the box, and the cables do not have to be threaded through the clamp, as is the case with boxes of prior construction, the placement of the cables is greatly facilitated. By tightening up the screw 20, the clamp is caused to firmly engage the cables and clamp them against the surfaces 8 to thereby securely attach them to the box. As there are no clamps or other cable-attaching devices located within the box, the interior of the box is clear and free of obstruction.

While I have shown and described a single embodiment of the invention, it will be obvious that various modifications may be made in the same without departing from the spirit of the invention. For example, while I have shown the clamp engaging two cables, it will be apparent that either one or more than two can be as easily held in position by slight changes in the shape of the clamp and in the number and disposition of the cable-receiving seats. Other changes coming within the scope of the annexed claims will be apparent to those skilled in the art.

What I claim is:

1. An outlet box including side walls, end walls and a back wall, spaced portions of one of the end walls and spaced portions of the back wall being bent inwardly to provide a pair of separate angular seats, each of which is intended for the reception of the end of an armored cable, each seat being apertured to permit of the passage of insulated wires from the cable into the box, a tongue portion disposed between and separating the seats, a clamp located externally of the box for engaging the two cables and holding them on the seats, and a clamping screw operative from within the box and threaded through the tongue for engaging the clamp between its points of engagement with the cables and holding said clamp in clamping relationship with the cables.

2. An outlet box including side walls, end walls and a back wall, portions of the end wall and portions of the back being co-operatively bent inwardly to provide a pair of spaced angular seats for the reception of the end portions of a pair of armored cables, said seats each having an apertured base or bottom through which the wires from the cable may enter into the box, each of said seats also including an arched wall portion against which the cable is clamped, a tongue formed between the seats, a clamp located externally of the box for simultaneously engaging the two cables and clamping them firmly against the arched wall portions of the seats, and a clamping screw operative from within the box and extending through the tongue between the seats for engaging the clamp and adjusting the clamping pressure of the same against the armor of the cables held by said clamp on the seats.

3. An outlet box including a pair of walls located substantially at right angles to one another, spaced portions of each of said walls adjacent the junction of said walls being directed inwardly to form a pair of spaced seats, each of said seats being adapted for the reception of the end portion of an armored cable, portions of said walls being disposed between said seats to provide a separating member, each of said seats having an apertured part through which wires of the cable are directed into the box, each seat also having a clamping surface substantially at right angles to the apertured part, said clamping surface being curved to conform to the curvature of the armor of the cable, a clamp located externally of the box for holding the cables against the clamping surfaces on the seats, said clamp having a recessed portion embracing the separating member and held thereby from assuming an angular position, and means operative from within the box and passing through the separating member and recessed portion of the clamp for adjusting the clamp.

DAVID DEMBER.